2,958,702
Patented Nov. 1, 1960

2,958,702
PROCESS OF PREPARING 16β-METHYL-11β-HYDROXY STEROIDS

David Taub, Metuchen, Robert D. Hoffsommer, Jr., Rahway, and Norman L. Wendler, Summit, N. J., assignors to Merck & Co., Inc., Rahway, N. J., a corporation of New Jersey No Drawing. Filed Sept. 3, 1958, Ser. No. 758,697

8 Claims. (Cl. 260—397.45)

This invention relates to an improved process for the preparation of 16β-methyl-11β-hydroxy steroids and is more particularly concerned with the production of 3-oxygenated-16β-methyl-11β,17α,21-trihydroxy pregnane-20-ones; 3 oxygenated-16β-methyl-11β,17α,21-trihydroxy-4-pregnene-20-ones and 3-oxygenated-16β-methyl-11β,17α,21-trihydroxy-1,4-pregnadiene-20-ones and to the novel intermediates formed in this process.

The present process comprises reducing the 11-keto group in a 16β-methyl-17α,21-dihydroxy-20-ketalized steroid of the pregnane series, having attached to the carbon in the 3 position either a substituent containing an unsaturated carbon to nitrogen linkage or a ketal substituent, with a metal hydride and hydrolizing the resulting 16β-methyl-11β,17α,21-trihydroxy-20-ketalized steroid having attached to the carbon in the 3 position either a substituent containing an unsaturated carbon to nitrogen linkage or a ketal substituent to reconvert the 3 and the 20 substituents into ketone groups, thereby forming a 16β-methyl-11β-17α,21-trihydroxy-3,20-diketo steroid of the pregnane series, which can be represented by the following structural formula:

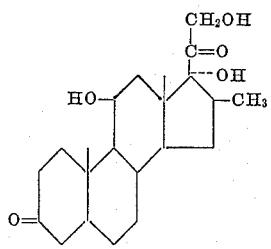

and Δ⁴ and Δ¹,⁴ derivatives thereof.

The present starting compounds, 16β-methyl-17α-21-dihydroxy-20-ketalized steroids, particularly 16β-methyl-17 - 20,20 - 21 - bismethylenedioxy - 3 - semicarbazido-4-pregnene-11-one 16β-methyl-17-20,20-21-bismethylenedioxy-3-semicarbazido-1,4-pregnadiene-11-one are conveniently prepared by contacting a 16β-methyl-17α,21-dihydroxy-3,20-diketo steroid with formaldehyde in the presence of an acid to first form the 17-20-20-21-bismethylenedioxy-16β-methyl-3,11-diketo steroid and subsequently treating with semicarbazide in a buffered medium to form the 17-20,20-21-bismethylenedioxy-16β-methyl-3-semicarbazido-11-keto steroid.

It was previously known to chemists skilled in the steroid art that the 11-keto group in a 3-oxygenated-17,21-dihydroxy-4-pregnene-11,20-dione could be reduced by first suitably protecting the 3 and 20-ketone groupings by formation of the corresponding 3,20-bissemicarbazone, reducing the 11-keto group with an alkali metal borohydride and subsequently regenerating the 3,20-diketone by hydrolysis with a strong acid. An alternative method, although not a preferable one, was to first form the 3,20-bisethylenedioxy derivatives of a 17,21-dihydroxy-4-pregnene-3,11,20-trione, reduce the 11-keto group in said bisethylendioxy compound with lithium aluminum hydride and subsequently regenerate the 3 and the 20-ketone groupings by hydrolysis with a solution of a strong acid. It has been suggested that in order to reduce the 11-keto group to a 11β-hydroxy group in a 3-oxygenated-16β-methyl-17,21-dihydroxy steroid, first, the 3,20-bissemicarbazone of the steroid be formed; second, the steroid bissemicarbazone be reduced with sodium borohydride; and third, the desired product, the 3-oxygenated-16β-methyl-11β,17α,21-trihydroxy steroid be formed by treatment of the reduced bissemicarbazone with a strong acid. Unfortunately, this process, when employed in the perparation of an 11β-hydroxy-16β-methyl steroid containing also a 17α-hydroxyl group, results in extensive elimination of the 17-hydroxyl group and a consequent poor yield of final product.

It is an object of the present invention to provide a novel process for the production of 3-oxygenated-16β-methyl-11β,17α,21-trihydroxy steroids. It is a further object of this invention to provide an improved process for the conversion of the 11-keto group to the 11β-hydroxy group in 16β-methyl-17α-hydroxy steroids and, at the same time, minimize the dehydration of the 17-hydroxyl group. Another object is the provision of novel steroid intermediates formed in the operation of this improved process. Another more specific object is the provision of a novel process for the production of 16β-methylhydrocortisone 16β-methylprednisolone and the 9-halogenated-16β-methyl hydrocortisone and prednisolone compounds. For example, treatment of 17-20,20-21-bismethylenedioxy - 3 - semicarbazido - 16β - methyl - 4-pregnene-11-one with a solution of sodium borohydride results in the reduction of the 11-keto group to form 17 - 20,20 - 21 - bismethylenedioxy - 16β - methyl - 3-semicarbazido-11β-hydroxy-4-pregnene. This compound is then further treated with a solution of an acid to regenerate the 3 and 20-ketone groupings and form 16β-methyl-11β,17α,21-trihydroxy-4-pregnene-3,20-dione.

The starting compounds of the present application are 16β-methyl-17α,21-dihydroxy-20-ketalized steroids of the pregnane series. These compounds may have, in addition to the 20-ketal substituent, an additional protecting group at position 3 of the steroid molecule. The reagent used for protection of the 3-keto group may be conveniently either a nitrogenous ketone reagent as for example, a semicarbazide, a hydrazine, a hydroxylamine or a substituted alkane diol as for example, ethylene glycol which results in the formation of either a 3-semicarbazone, a 3-hydrazone, a 3-oxime or a 3-ethylenedioxy derivative. The protection of the 3-ketone group in this manner prevents the concurrent reduction of the 3-ketone to a 3-hydroxy group. Thus, representative starting materials in our process are 16β-methyl-11-keto-20-ketalized steroids having attached to the carbon in the 3 position either a substituent containing an unsaturated carbon to nitrogen linkage or a ketal substituent. The preparation of the starting compounds is shown in detail in preparations 1 through 7. Representative examples of starting materials for our process comprise:

17 - 20,20 - 21 - bismethylenedioxy - 16β - methyl - 3-ethylenedioxy-5-pregnene-11-one 17 - 20,20 - 21 bismethylenedioxy - 16β - methyl - 3-semicarbazido-4-pregnene-11-one 17 - 20,20 - 21 - bismethylenedioxy - 16β - methyl - 3-semicarbazido-1,4-pregnadiene-11-one 3,20 - bisethylenedioxy - 16β - methyl - 17α,21 - dihydroxy-pregnane-11-one 3,20 - bisethylenedioxy - 16β - methyl - 17α,21 - dihydroxy-5-pregnene-11-one 17 - 20,20 - 21 - bismethylenedioxy - 16β - methyl - 3-propylenedioxy-5-pregnene-11-one 17 - 20,20 - 21 - bismethylenedioxy - 16β - methyl - 3-oximino-4-pregnene-11-one 17 - 20,20 - 21 - bismethylenedioxy - 16β - methyl - 3-phenylhydrazino-4-pregnene-11-one 17 - 20,20 - 21 - bismethylenedioxy - 16β - methyl - 3-propylenedioxy-pregnane-11-one 17 - 20,20 - 21 - bismethylenedioxy - 16β - methyl - 3-oximino-pregnane-11-one 17 - 20,20 - 21 - bismethylenedioxy - 16β - methyl - 3-phenylhydrazino-pregnane-11-one 17 - 20,20 - 21 bismethylenedioxy - 16β - methyl - 3-oximino-1,4-pregnadiene-11-one Regarded in certain of its broader aspects, the present invention comprises reducing the 11-keto substituent in a 16β-methyl-17α,21-dihydroxy 20-ketalized steroid of the pregnane series, having attached to the carbon in position three of the molecule either a ketal substituent or a substituent containing an unsaturated carbon to nitrogen linkage, to form the corresponding 16β-methyl-11β-hydroxy compound and hydrolyzing the 3 and 20 substituents of said 11β-hydroxy compound with a solution of an acid to form a 16β-methyl-11β,17α,21-trihydroxy-3,20-diketo steroid of the pregnane series.

In carrying out the first step of our novel process, the 16β-methyl-17α,21-dihydroxy - 20 - ketalized steroid having an additional "protecting" group at the 3 position is treated with a solution or a suspension of a metal hydride reducing agent to produce a novel 16β-methyl-11β,17α,21-trihydroxy-20-ketalized steroid. Thus, for example, 16β-methyl-17-20,20-21 - bismethylenedioxy - 3-semicarbazido-4-pregnene-11-one; 16β - methyl - 17-20, 20-21-bismethylenedioxy - 3 - semicarbazido - 1,4-pregnadiene - 11 - one; 16β-methyl-17-20,20-21-bismethylenedioxy - 3 - semicarbazido pregnane-11-one; 16β-methyl-17-20,20-21 - bismethylenedioxy - 3 - ethylenedioxy - 5-pregnene - 11 - one; 16β-methyl-17-20,20-21-bismethylenedioxy - 3-ethylenedioxy pregnane-11-one; 16β-methyl-3,20 - bisethylenedioxy-17α,21 - dihydroxy-5-pregnene-11-one and 16β - methyl-3,20-bisethylene-dioxy-17α,21-dihydroxy pregnane - 11 - one are converted by this reduction treatment to the novel 11β-hydroxy steroids as, for example, 16β - methyl - 17-20,20-21-bismethylenedioxy-3-semicarbazido - 11β - hydroxy-4-pregnene; 16β-methyl-17-20,20-21 - bismethylenedioxy - 3 - semicarbazido-11β-hydroxy - 1,4 - pregnadiene; 16β-methyl-17-20,20-21-bismethylenedioxy - 3-semicarbazido-11β-hydroxy pregnane; 16β - methyl-17-20,20-21-bismethylenedioxy - 3 - ethylenedioxy-11β-hydroxy - 5 - pregnene; 16β - methyl - 17-20, 20-21-bismethylenedioxy - 3 - ethylenedioxy pregnane; 16β - methyl - 3,20-bisethylenedioxy - 11β,17α,21-trihydroxy - 5 - pregnene and 16β-methyl-3,20-bisethylenedioxy - 11β,17α,21 - trihydroxy pregnane. The process is carried out by mixing a suitably protected 16β-methyl-11-keto steroid, using either order of addition, with at least a theoretical amount of metal hydride reducing agent such as, for example, lithium aluminum hydride, sodium borohydride, or lithium borohydride in an organic solvent which is non-reactive under the reaction conditions, at a temperature below about 120° C. preferably between about 25° C. and 100° C. Usually, it is preferred to use an excess of reducing agent, preferably between about 5 and 20 moles of reducing agent per mole of the starting 16β-methyl-11-keto steroid. The time required for the reaction is not critical and may be varied between about one hour and up to about 24 hours. The length of time is dependent, of course, on the solvent, the temperature, and the particular reducing agent employed. The excess non-reacted reducing agent is then hydrolyzed in the ordinary manner, preferably by the addition of an ice and water mixture, or a solution of a dilute acid and the 16β-methyl-11β-hydroxy steroid separated from the reaction mixture by conventional methods, such as filtration or extraction. The solvent used is preferably one which is non-reactive under the reaction conditions, and for this purpose there are a number which are suitable such as, for example, ether, benzene, tetrahydrofuran, dioxan, a lower alcohol, and the like.

In a preferred embodiment of this reduction process a solution of 16β-methyl - 17-20,20-21-bismethylenedioxy-3-semicarbazido-1,4-pregnadiene - 11-one in tetrahydrofuran is contacted with a solution of an excess of sodium borohydride dissolved in aqueous tetrahydrofuran. The mixture is then stirred at the reflux temperature for a period of about 18 hours. Additional sodium borohydride is then added to the mixture and the reaction mixture heated again for another 7 hours to insure complete reduction of the 11-keto group. Following this additional 7-hour treatment, the reaction mixture is cooled, the excess reducing agent hydrolyzed by treatment with a mixture of aqueous acetic acid and the volatile solvents removed from the product by evaporation of the reaction mixture in vacuo. The product is then precipitated by the addition of a small amount of water to the residual material and the resulting aqueous slurry filtered to recover the product, 16β-methyl-17-20,20-21-bismethylenedioxy-3-semicarbazido-1,4-pregnadiene-11β-ol.

When the starting 11-keto steroid compound contains as one of its protective substituents an unsaturated carbon to nitrogen linkage attached to the three position of the molecule, it is preferred to use, as the reducing agent, an alkali metal borohydride since lithium aluminum hydride is thought to affect substantial reduction of an unsaturated carbon to nitrogen linkage as, for example, a semicarbazone, an oxime, or an arylhydrazone. However, when both the 3 and 20 positions are protected by ketal substituents, any of the well-known metal hydride reducing agents may be employed as mentioned above, as for example, an alkali metal borohydride or an alkali metal aluminum hydride, and the like.

In carrying out the novel hydrolysis step, the second step in the above described procedure, the novel 16β-methyl-11β-hydroxy steroid having both the 3 and 20 positions "protected" obtained by the above reduction process, is dissolved in an organic solvent which may be non-reactive under the conditions of reaction such as, for example, methanol, acetone, isopropyl alcohol, methyl ethyl ketone, benzene, and the like, or mixtures of the above solvents. Alternatively, the solvent for the steroid may be one which itself effects the hydrolysis reaction as, for example, an aqueous solution of acetic or formic acids. The acid hydrolyzing agents ordinarily employed are the mineral acids such as, for example, hydrochloric acid, sulfuric acid, phosphoric acid or, as mentioned above, a strong lower aliphatic carboxylic acid, such as acetic or formic acid, and the like aqueous acetic acid being preferred. The concentration of the hydrolyzing agent is not critical, and solutions having a pH of above two up to solutions concentrated with respect to the acid are acceptable, the range, in the case of mineral acids, from about 0.1 normal to 2 normal being preferred, and in the case of the lower aliphatic carboxylic acids, approximately a 10–90% aqueous solution of the acid being preferred. The order of addition of reactants is not critical and any order of admixture with the starting steroid, hydrolyzing agent, and/or water is satisfactory.

The reaction is conducted at temperatures ranging between about 0° C. and the boiling point of the reaction mixture, temperatures at or near the boiling point of the mixture ordinarily being preferred. In actual practice the 11β-hydroxy steroid is dissolved in the solvent, with or without additional hydrolyzing agent, and the mixture maintained slightly below the boiling point for a period of approximately 4 hours when aqueous acetic acid is used as the solvent and the hydrolyzing agent.

When hydrolysis of the 11β-hydroxy steroid is substantially complete, the volatile solvents are removed in conventional manner, preferably by evaporation of the total mixture in vacuo, to yield a residue containing the desired 16β-methyl-11β,17α,21-trihydroxy - 3,20 - diketo steroid from which the product may be separated by conventional procedures.

The following examples are given for purposes of illustration and not by way of limitation:

PREPARATION 1

17-20,20-21-bismethylenedioxy-16β-methyl-4-pregnene-3,11-dione

To a stirred solution of 7.43 g. of 16β-methyl-17α,21-dihydroxy-4-pregnene-3,11,20-trione in 365 ml. of methylenechloride at room temperature is added a solution, premixed at 0° C., of 110 ml. of low methanol content formaldehyde (37% aqueous solution) and 110 ml. of concentrated hydrochloric acid. The reaction mixture is stirred at room temperature (approximately 25° C.) and 960 ml. of water are added. The layers are separated and the aqueous layer is extracted with three 200 ml. portions of methylene chloride. The combined methylene chloride extracts of the product are washed successively with 200 ml. of water, aqueous potassium bicarbonate solution, and again with a 200 ml. portion of water. The methylene chloride solutions are then dried over magnesium sulfate and evaporated to dryness in vacuo to form a residue comprising the product. On trituration of the residue with ether substantially pure product is obtained, M.P. 236–247° C. dec.

$\lambda_{max}^{MeOH}$ 2380, E% 367

$\lambda_{max}^{CHCl_3}$ 5.86, 6.00, 6.15, 9.1–9.2 μ

PREPARATION 2

17α-20,20-21-bismethylenedioxy-16β-methyl-1,4-pregnadiene-3,11-dione

To a stirred solution of 1.15 g. 17α,21-dihydroxy-16β-methyl-1,4-pregnadiene-3,11,20-trione and 60 ml. of methylene chloride is added a cold (0–5° C.) premixed solution of 17 ml. of 37% aqueous formaldehyde (low methanol) and 17 ml. of concentrated hydrochloric acid. The mixture is stirred vigorously for 40 hours at 25° C., approximately 120 ml. of water is added and the mixture extracted three times with methylene chloride. The combined methylene chloride extracts containing the product are washed successively with excess aqueous 5% potassium bicarbonate solution and with water, then dried over magnesium sulfate and evaporated to dryness in vacuo to yield a residue comprising the product. Crystalline 17α-20,20-21-bismethylenedioxy-16β-methyl-1,4-pregnadiene-3,11-dione is obtained by crystallization from acetone ether. M.P. 203–206°;

$\lambda_{max}^{CH_3OH}$ 238 mu E% 370

$\lambda_{max}^{CHCl_3}$ 5.84, 6.00, 6.13, 6.19, 9.15, μ

PREPARATION 3

3-semicarbazido-17α-20,20-21-bismethylenedioxy-16β-methyl-1,4-pregnadiene-11-one To a solution of 100 mg. of 17α-20,20-21-bismethylenedioxy-16β-methyl-1,4-pregnadiene-3,11-dione in two ml. of methanol and 1.2 ml. of dimethylformamide are added 80 mg. of semicarbazide free base and 20 mg. of semicarbazide hydrochloride. The mixture is stirred at 25° C. for 18 hours during which time the product partially precipitates. Water is added to completely precipitate the product and the product is recovered by filtration. It is then washed with water and dried in air to give crystalline 3-semicarbazido-17α-20,20-21-bismethylenedioxy-16β-methyl-1,4-pregnadiene-11-one. M.P. 245–255 dec.

$\lambda_{max}^{CH_3OH}$ 295 mu E% 453, 246 mu E% 219

$\lambda_{max}^{Nujol}$ 2.92, 3.18, 5.70, 5.92, 6.3, 9.2 μ

PREPARATION 4

3-semicarbazido-17α-20,20-21-bismethylenedioxy-16β-methyl-4-pregnene-11-one

To a solution of 200 mg. of 17α-20,20-21-bismethylenedioxy-16β-methyl-4-pregnene-3,11-dione in 5 ml. of methanol and 2.5 ml. of dimethyformamide is added 160 bg. of semicarbazide free base and 40 mg. of semicarbazide hydrochloride. The mixture is stirred at 25° C. for 18 hours during which time the product partially precipitates. Water is then added and the product filtered, washed in water and dried in air to give 3-semicarbazido-17α,20,20-21-bismethylenedioxy-16β-methyl-4-pregnene-11-one.

PREPARATION 5

17α-20,20-21-bismethylenedioxy-16β-methyl-pregnane-3,11-dione

To a stirred solution of 3.3 g. of 17α,21-dihydroxy-16β-methylpregnane-3,11,20-trione dissolved in 120 ml. of methylene chloride is added a cold premixed solution of 34 ml. of 37% aqueous formaldehyde (low methanol) and 34 ml. of concentrated hydrochloric acid. The mixture is stirred vigorously for 30 hours at 25° C. to form the product. To the mixture is added approximately 250 ml. of water and the two phase system is then extracted three times with methylene chloride to extract the product. The combined methylene chloride extract is then washed successively with excess 5% aqueous potassium bicarbonate solution and water and the washed extract is dried over magnesium sulfate. The methylene chloride is removed by evaporation in vacuo leaving a solid residue comprising the product. This residual solid is crystallized from a mixture of acetone and ether to give substantially pure 17α-20,20-21-bismethylenedioxy-16β-methylpregnane-3,11-dione.

PREPARATION 6

3,20-bisethylenedioxy-16β-methyl-17α-21-dihydroxy-5-pregnene-11-one

To a solution of 500 mg. of 16β-methyl-17α,21-dihydroxy-4-pregnene-3,11,20-trione in 10 ml. of ethylene glycol and 50 ml. of benzene is added 50 mg. of p-toluene sulfonic acid monohydrate and the mixture is refluxed for 20 hours utilizing a water separator to remove the water as it azeotropically distills. The mixture is then cooled to room temperature and 0.1 g. potassium hydroxide in 2 ml. of ethanol was added. An equivalent amount of water is added to the mixture and the organic layer containing the product is separated, dried and the solvent removed by concentration in vacuo to yield a residue comprising the product. The residue is then crystallized from a mixture of acetone-ether to give substantially pure 3,20-bisethylenedioxy-17α,21-dihydroxy-5-pregnene-11-one. The product gives a negative tetrazolium test and exhibits no maxima above 220 mu in the ultraviolet region.

PREPARATION 7

3-ethylenedioxy-17α-20,20-21-bismethylenedioxy-16β-methyl-5-pregnene-11-one

To a mixture of 600 mg. of 17α-20,20-21-bismethylenedioxy-16β-methyl-4-pregnene-3,11-dione and 11 ml. of ethylene glycol and 60 ml. of benzene is added 60 mg. p-toluene sulfonic acid monohydrate and the mixture is refluxed for 20 hours using a water separator to remove the water as it forms and azeotropically distills. The mixture is cooled to room temperature and 0.12 g. of potassium hydroxide and 2.5 ml. methanol is added. To the cooled, neutralized mixture is added an equal amount of water, the organic layer containing the product is separated, dried over sodium carbonate and concentrated in vacuo to yield a solid residue comprising the product. The solid residue is then crystallized from a mixture of acetone and ether to give substantially pure 3-ethylenedioxy-17α-20,20-21-bismethylenedioxy - 4 - pregnene-11-one. This material shows a negative tetrazolium test and exhibits no maxima above 220 mu in the ultraviolet absorption region.

The starting compounds of the present application are prepared from new 16β-methyl steroids which are prepared in accordance with procedures described in the copending application of David Taub, Norman L. Wendler, and Harry L. Slates, Serial No. 722,390, filed March 19, 1958. These processes are as follows:

To a solution of 3α-acetoxy-16-pregnene-11,20-dione in a mixture of tetrahydrofuran and ethyl ether is added diazomethane to produce 3α-acetoxy-16α,17α-methyleneazopregnane-11,20-dione (M.P. 186–190° C.) which precipitated from solution. Heating this compound at about 180° C. in vacuo produces 3α-acetoxy-16-methyl-16-pregnene, 11,20, dione (M.P. 165–167° C.) which upon reaction with hydrogen peroxide in the presence of sodium hydroxide in methanol solution for 18 hours at room temperature affords 16α,17α-epoxy-3α-hydroxy-16β-methyl-pregnane-11,20-dione (M.P. 178–180° C.). When this compound is treated with perchloric acid in aqueous dioxane at 25–30° C. for 65 hours and the resulting reaction mixture is diluted with water a mixture of 3α,17α-dihydroxy-16-methyl-15-pregnene-11,20-dione and 3α,17α-dihydroxy-16-methylene - pregnane (M.P. 158–167° C.) is precipitated and recovered by filtration. Reduction of this mixture with hydrogen in methanol in the presence of palladium-calcium carbonate catalyst affords a mixture of 3α,17α-dihydroxy-16α-methyl-pregnane-11,20-dione and 3α,17α-dihydroxy-16β-methyl-pregnane-11,20-dione sintering at 150° C. Bromination of this mixture with bromine in chloroform at 40–45° C. affords a mixture of 21-bromo-3α,17α-dihydroxy-16α-methylpregnane-11,20-dione and 21-bromo-3α,17α-dihydroxy-16β-methylpregnane-11,20-dione which upon reaction with potassium acetate and potassium iodide in acetone produces a mixture of 3α,17α,21-trihydroxy-16β-methyl-pregnane-11,20-dione-21-acetate and 3α,17α,21-trihydroxy-16α-methylpregnane-11,20-dione-21 - acetate.

To a solution of the above mentioned mixture of 21-acetates in aqueous t-butanol at 10–15° C. is added N-bromosuccinimide to produce a mixture of 17α,21-dihydroxy - 16α - methylpregnane - 3,11,20 - trione - 21-acetate and 17α,21-dihydroxy-16β-methylpregnane-3,11,20-trione-21-acetate which on chromatography on neutral aumina and elution with chloroform-benzene (1:1) and benzene yield 17α,21-dihydroxy-16β-methylpregnane-3,11,20-trione-21-acetate (M.P. 210–213° C.). The 17α,21 - dihydroxy - 16β - methylpregnane-3,11,20-trione-21-acetate thus obtained is then reacted with potassium bicarbonate and aqueous methanol to produce the 21-alcohol. Reaction of this compound with bromine in a mixture of acetic acid and chloroform affords the corresponding 4-bromo compound (M.P. 165–170° C. dec.) which is converted by reaction with semicarbazide to the 3-semicarbazone of 17α,21 - dihydroxy - 16β - methyl-4-pregnene-3,11,20-trione-21-acetate. Treatment of this compound with a mixture of acetic acid and pyruvic acid gives 17α,21 - dihydroxy-16β-methyl-4-pregnene-3,11,20-trione-21-acetate (M.P. 226–232° C.). This compound is converted to the corresponding 1,4-pregnadiene compound by reacting it with selenium dioxide in t-butyl alcohol under reflux for 48 hours. The 17α,21-dihydroxy - 16β - methyl - 1,4-pregnadiene-3,11,20-trione-21-acetate so obtained is then reacted with potassium bicarbonate in aqueous methanol to produce the 21-alcohol. Thus 17α,21-dihydroxy - 16β - methyl-4-pregnene-3,11,20-trione-21-acetate obtained above is similarly reacted with potassium bicarbonate in aqueous methanol to produce the 21-alcohol.

PREPARATION 8

16β-methyl-17-20,20-21-bismethylenedioxy-3-ethylenedioxy pregnane-11-one

To a solution of 250 mg. of 16β-methyl-17-20,20-21-bismethylenedioxy pregnane-3,11-dione, which may be prepared as described in Preparation 5, in 10 ml. of ethylene glycol and 30 ml. of benzene is added 25 mg. of p-toluene sulfonic acid monohydrate and the mixture refluxed for a period of approximately 15 hours using a water separator to remove the water as it azeotropically distills. The entire reaction mixture is then cooled to room temperature ( approximately 25° C.) and 0.1 g. potassium hydroxide and 2 ml. of ethanol is added. Approximately 15 ml. of water is added to the mixture and the organic layer containing the product is separated, dried and the solvent removed by concentration in vacuo to yield a residue comprising the product. The product is then crystallized from a mixture of acetone-ether to give substantially pure 16β-methyl-17-20,20-21-bismethylenedioxy - 3 - ethylenedioxy pregnane-11-one. This material exhibits a negative tetrazolium test and shows no maxima above 220 mu in the ultraviolet region.

PREPARATION 9

16β-methyl-17-20,20-21-bismethylenedioxy-3-semicarbazido pregnane-11-one

To a solution of 150 mg. of 17-20,20-21-bismethylenedioxy-16β-methyl-pregnane-3,11-dione in 3 ml. of methanol and 1.8 ml. of dimethylformamide is added 120 mg. of semicarbazide free base and 40 mg. semicarbazide hydrochloride. The reaction mixture thus formed is stirred at 25° C. for about 20 hours, during which time the product partially precipitates. Water is then added to completely precipitate the product and the product is recovered by filtration. It is then washed with water on the filter and air dried to give crystalline 16β - methyl - 17-20,20-21 - bismethylenedioxy-3-semicarbazido pregnane-11-one.

PREPARATION 10

16β-methyl-17α,21-dihydroxy-3,20-bisethylenedioxy pregnane-11-one

Approximately 400 mg. of 16β-methyl-17α,21-dihydroxy pregnane-3,11,20-trione is dissolved in approximately 10 ml. of ethylene glycol and 40 ml. of benzene. To the mixture is added 40 mg. of p-toluene sulfuric acid monohydrate and the reaction mixture maintained for a period of about 24 hours at reflux temperature utilizing a water separator to remove the water as it azeotropically distills. The mixture is then cooled to room temperature and 0.1 g. potassium hydroxide and 2 ml. of ethanol is added. An equivalent amount of water was added to the mixture and the organic layer containing the product is separated, dried and the solvent removed by concentration in vacuo to yield a residue comprising the product. This residual material is then crystallized from a mixture of acetone-ether to give substantially pure 16β-methyl-3,20-bisethylenedioxy-17α,21-dihydroxy pregnane-11-one.

EXAMPLE 1

16β-methyl-11β,17α,21-trihydroxy-1,4-pregnadiene-3,20-dione

A. Reduction step:

A solution is prepared by dissolving 210 mg. of 16β-methyl-17-20,20-21-bismethylenedioxy - 3-semicarbazido-1,4-pregnadiene-11-one in 10 ml. of tetrahydrofuran. To the solution is added 300 mg. sodium borohydride in 1 ml. of water and 1 ml. of tetrahydrofuran. The mixture is stirred while maintaining it at the reflux temperature for approximately 18 hours. Additional sodium borohydride (approximately 200 mg.) is then added to insure complete reduction of the 11-keto function, and the mixture stirred and maintained at the reflux temperature for an additional 7 hours. It is then cooled, and a solution of 0.5 ml. of acetic acid in 2 ml. of water is added to effect hydrolysis of the excess borohydride. The major portion of the solvent is then removed from the reaction mixture by concentration in vacuo. Additional water is then added to the reaction mixture to effect precipitation of the product. When no further precipitation occurs on the addition of water, the granular precipitate containing the product is filtered, washed with water and dried in air to give substantially pure 16β-methyl-17-20,20-21-bismethylenedioxy-3-semicarbazido-1,4-pregnadiene-11β-ol $$\lambda_{max.}^{CH_3OH} \ 294, \ 245 \ mu$$

B. Hydrolysis step:

Approximately 210 mg. of the product formed in part A of this example is dissolved in 15 ml. of acetic acid and 15 ml. of water and the temperature of the mixture is maintained at about 100° C. by warming on the steam bath for about 4 hours. The entire mixture is then cooled to room temperature and concentrated in vacuo nearly to dryness. A solution of aqueous sodium chloride is then added to the residual material containing the product, and the product is extracted with ethyl acetate. The separated ethyl acetate extract of the product is washed successively with 5% aqueous potassium bicarbonate solution and aqueous sodium chloride solution, dried over magnesium sulfate, and after removal of the drying agent by filtration the filtrate containing the product is concentrated to a solid residue. 16β-methyl-11β,17α,21-trihydroxy-1,4-pregnadiene-3,20-dione is crystallized by trituration of the residue in ether and can be further purified by crystallization from a mixture of acetone-ether, M.P. 205–210°;

$$\lambda_{max.}^{CH_3OH} \ 243 \ mu \ E\% \ 381$$

$$\lambda_{max.}^{chf.} \ 2.90, \ 3.00, \ 5.85, \ 6.02, \ 6.16, \ 6.21, \ 11.24 \ \mu.$$

$$[\alpha]_D^{chf.} +145°$$

EXAMPLE 2

*16β-methyl-11β,17α,21-trihydroxy-4-pregnene-3,20-dione*

A. Reduction step:

To a solution of 500 mg. of 16β-methyl-17-20,20-21-bismethylenedioxy-3-semicarbazido-4-pregnene-11-one, which may be prepared as described in Preparation 4 above, in 25 ml. of tetrahydrofuran is added 750 mg. of sodium borohydride and 2.5 ml. of water and 2.5 ml. of tetrahydrofuran. The mixture is stirred while maintaining it at the reflux temperature for a period of about 15 hours. Another 300 mg. of sodium borohydride is added and the mixture stirred and refluxed for an additional 5 hours. It is then cooled, 2.2 ml. of acetic acid and 5 ml. of water is added and the major portion of the solvent is removed by concentration of the mixture in vacuo. Water is then added to precipitate the formed product and the precipitate is filtered, washed with water and dried in air to give 16β-methyl-17-20,20-21-bismethylenedioxy-3-semicarbazido-4-pregnene-11β-ol.

B. Hydrolysis step:

A solution of 420 mg. of 17-20,20-21-bismethylenedioxy-3-semicarbazido-4-pregnene-11β-ol (prepared as described in part A of this example) and 30 ml. of acetic acid and 30 ml. of water is prepared and heated to approximately 100° C. on the steam bath for a period of about 4 hours. The entire reaction mixture is then cooled and concentrated in vacuo nearly to dryness. To the residual material containing the product is added aqueous sodium chloride solution and the slurry which forms is extracted with ethyl acetate to remove the product. The organic extract, containing the product, is successively washed with 5% aqueous potassium bircarbonate solution and aqueous sodium chloride solution, dried and concentrated to dryness to yield a residue comprising the product. Substantially pure 16β-methyl-11β,17α,21-trihydroxy-4-pregnene-3,20-dione is then obtained by trituration with ether. The product may be further purified by crystallization from a mixture of acetone-ether.

EXAMPLE 3

*16β-methyl-11β,17α,21-trihydroxy-4-pregnene-3,20-dione*

A. Reduction step:

To 100 mg. of 16β-methyl-3,20-bisethylenedioxy-17α,21-dihydroxy-5-pregnene-11-one (prepared as described in Preparation 6 above) in 10 ml. of dried tetrahydrofuran is added 100 mg. of lithium aluminum hydride and 5 ml. of tetrahydrofuran. The mixture is maintained at its reflux temperature in an atmosphere of nitrogen for about 1½ hours. The entire reaction mixture is then cooled to about 25° C. and 1 ml. of ethyl acetate added to the mixture to destroy any excess lithium aluminum hydride present. Approximately 1 ml. of saturated solution of sodium sulfate is then added to the mixture to effect precipitation of any inorganic salts present, following which approximately 2 g. of anhydrous magnesium sulfate is added to remove any water present in the mixture. The inorganic precipitate is then removed from the reaction mixture by filtration and the precipitated inorganic salts washed on the filter with a small amount of ethylacetate to wash out any occluded product. The filtrate and washings containing the product are combined and evaporated to dryness in vacuo to give a solid residue comprising 16β-methyl-11β,17α,21-trihydroxy-3,20-bisethylenedioxy-5-pregnene.

B. Hydrolysis step:

The product obtained according to part A of this example is dissolved in 10 ml. of methanol and to the solution is added 10 ml. of 4 N sulfuric acid solution. The resulting solution is refluxed for about an hour, then is cooled and neutralized with about 10 ml. of dilute sodium bicarbonate solution. At first, a precipitate of inorganic salts forms on addition of the bicarbonate solution. The mixture is concentrated on a steam bath under reduced pressure, whereupon the inorganic salts dissolve and the organic product begins to precipitate. After most of the product precipitates the mixture is cooled to effect more complete precipitation and filtered to recover the product, 16β-methyl-11β,17α,21-trihydroxy-4-pregnene-3,20-dione.

EXAMPLE 4

*16β-methyl-11β,17α,21-trihydroxy-4-pregnene-3,20-dione*

A. Reduction step:

To a suspension of 170 mg. of lithium aluminum hydride and 5 ml. of anhydrous ether is added 350 mg. of 16β-methyl-17-20,20-21-bismethylenedioxy-3-ethylenedioxy-5-pregnene-11-one dissolved in 20 ml. of tetrahydrofuran. The material is added slowly while constantly cooling the reaction mixture. After all the steroid solution has been added, the mixture is heated at reflux temperature for approximately 2½ hours and is then cooled and the excess reducing agent is decomposed by the cautious addition of water. To the reaction mixture is then added approximately 4 ml. of water followed by 20 ml. of ether. The precipitate which forms is removed by filtration. To the filtrate containing the product is added 20 ml. of water and the ether layer containing the product is separated. The ether extract is then washed with water and concentrated to dryness yielding a crude residue comprising 16β-methyl-17-20,20-21-bismethylenedioxy-3-ethylenedioxy-5-pregnene-11β-ol.

B. Hydrolysis step:

The product obtained according to part A of this example is dissolved without further purification in 20 ml. of acetic acid and 20 ml. of water and the mixture is warmed on a steam bath (approximately 100° C.) for about 5 hours. It is then cooled and concentrated nearly to dryness in vacuo. Aqueous sodium chloride is added to the nearly dried residue containing the product and the aqueous mixture extracted with ethyl acetate. The ethyl acetate extract is washed with 5% aqueous potassium carbonate solution and aqueous sodium chloride solution, dried over anhydrous magnesium sulfate, and the dried organic extract concentrated to dryness to give a residue comprising 16β-methyl-11β,17α,21-trihydroxy-4-pregnene-3,20-dione.

EXAMPLE 5

*16β-methyl-11β,17α,21-trihydroxy pregnane-3,20-dione*

A. Reduction step:

A solution of 200 mg. of 16β-methyl-17-20,20-21-bismethylenedioxy-3-ethylenedioxy pregnane-11-one and 100 mg. of lithium borohydride in 4 ml. of tetrahydrofuran is allowed to reflux for a period of approximately 1.5 hours. Two ml. of 2 normal sulfuric acid is then carefully added in order to destroy the excess reducing agent. The reaction mixture is then cooled, poured into a mixture of ice and water, and extracted several times with ethyl acetate. The ethyl acetate solution is washed with water and dried over anhydrous sodium sulfate. After removal of the drying agent by filtration, the filtrate containing the product is evaporated to dryness to give 16β-methyl-17-20,20-21-bismethylenedioxy-3-ethylenedioxy pregnane-11β-ol.

B. Hydrolysis step:

The product obtained in part A of this example is dissolved in 15 ml. of acetic acid and 15 ml. of water. The resulting solution is heated to about 100° for a period of about 6 hours. It is then cooled and concentrated in vacuo nearly to dryness. The product is extracted with ethyl acetate and the combined ethyl acetate extract is washed successively with aqueous 5% potassium bicarbonate solution and aqueous sodium chloride. The separated extracts are then dried over magnesium sulfate. After removal of the drying agent by filtration the filtrate containing the product is concentrated to dryness to yield a residue comprising as the principal organic product, 16β-methyl-11β,17α,21-trihydroxy pregnane-3,20-dione.

EXAMPLE 6

*16β-methyl-11β,17α,21-trihydroxy pregnane-3,20-dione*

A. Reduction step:

To a solution of 300 mg. of 16β-methyl-17-20,20-21-bismethylenedioxy-3-ethylenedioxy pregnane-11-one in 15 ml. of tetrahydrofuran is added 400 mg. of sodium borohydride in 2 ml. of water and 2 ml. of tetrahydrofuran. The mixture is stirred and refluxed for about 15 hours. At this point approximately 200 mg. additional sodium borohydride is added and the mixture is stirred and refluxed an additional 6 hours. The entire reaction mixture is then cooled, 1 ml. acetic acid in 2 ml. of water was added in order to destroy the excess reducing agent and most of the solvent removed by concentration of the reaction mixture in vacuo. Additional water is added to effect complete precipitation of the product, 16β-methyl-17-20,20-21-bismethylenedioxy-3-semicarbazido pregnane-11β-ol, and the precipitate filtered, washed with water and dried in air.

B. Hydrolysis step:

The product obtained in part A of this example is dissolved in 20 ml. of acetic acid and 20 ml. of water and the mixture maintained at about 100° C. for a period of about 6 hours. The reaction mixture is then cooled to room temperature and concentrated nearly to dryness. The formed product is extracted from the reaction mixture, after first adding aqueous sodium chloride solution, with several portions of ethyl acetate. The ethyl acetate extract containing the product is washed with aqueous potassium carbonate solution and aqueous sodium chloride solution, dried and concentrated to dryness. The residual material readily crystallizes on trituration with ether to give substantially pure 16β-methyl-11β,17α,21-trihydroxy pregnane-3,20-dione.

EXAMPLE 7

*16β-methyl-11β,17α,21-trihydroxy pregnane-3,20-dione*

In the manner described in Example 3, 17α,21-dihydroxy-3,20-bisethylenedioxy pregnane-11-one is refluxed with lithium aluminum hydride in solution with tetrahydrofuran and then hydrolyzed with aqueous sulfuric acid to yield 16β-methyl-11β,17α,21-trihydroxy pregnane-3,20-dione.

Various changes and modifications may be made in the present invention, certain preferred embodiments of which are herein disclosed, without departing from the scope thereof; to the extent that these changes and modifications are within the scope of the appended claims, they are to be considered a part of this invention.

We claim:

1. A process for the preparation of a member of the group consisting of the 16β-methyl-11β,17α,21-trihydroxy-20-keto steroid of the formula;

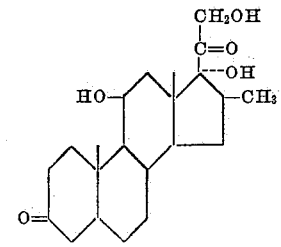

and Δ⁴ and Δ¹,⁴ derivatives thereof which comprises contacting a corresponding 16β-methyl-17α,21-dihydroxy-20-ketalized-11-keto steroid having attached to the carbon in the three position a substituent containing an unsaturated carbon to nitrogen linkage selected from the group consisting of semicarbazones, hydrazones and oximes with a metal hydride reducing agent to form the corresponding 16β-methyl-11β,17α,21-trihydroxy-20-ketalized steroid having attached to the carbon in the three position a substituent containing an unsaturated carbon to nitrogen linkage and contacting said 11β-hydroxy-20-ketalized steroid with a solution of an acid.

2. A process for the preparation of a member of the group consisting of the 16β-methyl-11β,17α,21-trihydroxy-20-keto steroid of the formula;

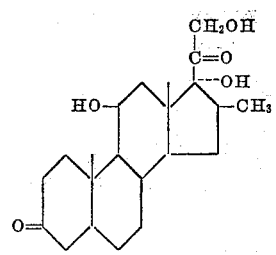

and Δ⁴ and Δ¹,⁴ derivatives thereof, which comprises contacting a corresponding 16β-methyl-17-20,20-21-bismethylenedioxy-11-keto steroid, having attached to the carbon in the three position a substituent containing an unsaturated carbon to nitrogen linkage selected from the group consisting of semicarbazones, hydrazones and oximes, with an alkali metal borohydride to form the corresponding 16β-methyl-11β-hydroxy-17-20,20-21-bismethylenedioxy steroid having attached to the carbon in the three position a substituent containing an unsaturated carbon to nitrogen linkage and contacting said 11β-hydroxy steroid with a solution of an acid.

3. A process for the preparation of a member of the group consisting of the 16β-methyl-11β,17α,21-trihydroxy-20-keto steroid of the formula;

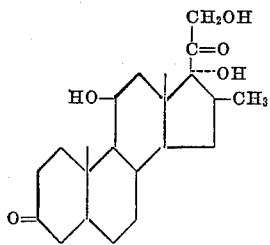

and Δ⁴ and Δ¹,⁴ derivatives thereof, which comprises contacting a corresponding 16β-methyl-17-20,20-21-bismethylenedioxy-3-semicarbazido-11-keto steroid with an alkali metal borohydride to form the corresponding 16β-methyl-17-20,20-21-bismethylenedioxy-3-semicarbazido - 11β - hydroxy steroid and contacting said 3-semicarbazido-11β-hydroxy steroid with a solution of an acid.

4. A process for the preparation of 16β-methyl-11β,17α,21-trihydroxy-4-pregnene - 3,20 - dione, which comprises contacting 16β-methyl-17-20,20-21-bismethylenedioxy-3-semicarbazido-4-pregnene-11-one with sodium borohydride to form 16β-methyl-11β-hydroxy-17-20,20-21-bismethylenedioxy-3-semicarbazido - 4 - pregnene and contacting said 11β-hydroxy-4-pregnene with a solution of aqueous acetic acid.

5. A process for the preparation of 16β-methyl-11β,17α,21-trihydroxy - 1,4 - pregnadiene - 3,20 - dione, which comprises contacting 16β-methyl-17-20,20-21-bismethylenedioxy-3-semicarbazido-1,4-pregnadiene-11-one with sodium borohydride to form 16β-methyl-11β-hydroxy-17-20,20-21-bismethylenedioxy-3-semicarbazido-1,4-pregnadiene and contacting said 11β-hydroxy-1,4-pregnadiene with a solution of an acid.

6. A process for the preparation of 16β-methyl-11β,17α,21-trihydroxy pregnane-3,20-dione, which comprises contacting 16β-methyl-17-20,20-21-bismethylenedioxy-3-semicarbazido pregnane-11-one with sodium borohydride to form 16β-methyl-11β-hydroxy-17-20,20-21-bismethylenedioxy-3-semicarbazido pregnane and contacting said 11β-hydroxy pregnane with a solution of an acid.

7. A process for the preparation of 16β-methyl-11β,17α,21-trihydroxy-4-pregnene-3,20-dione, which comprises contacting 16β-methyl-17-20,20 - 21-bismethylenedioxy-3-semicarbazido-4-pregnene-11β-ol with a solution of an acid.

8. A process for the preparation of 16β-methyl-11β,17α,21-trihydroxy-1,4-pregnadiene-3,20-dione, which comprises contacting 16β-methyl-17-20,20-21-bismethylenedioxy-3-semicarbazido-1,4-pregnadiene-11β-ol with a solution of an acid.

References Cited in the file of this patent

UNITED STATES PATENTS 2,854,383   Herzog _____ Sept. 30, 1958
2,866,799   Beyler et al. _____ Dec. 30, 1958